(12) United States Patent
Futamura et al.

(10) Patent No.: US 6,519,831 B2
(45) Date of Patent: Feb. 18, 2003

(54) PROGRESSIVE PROCESSING DEVICE (75) Inventors: Shoji Futamura, Atsugi (JP); Takeo Machida, Yokohama (JP); Chikara Murata, Yokohama (JP); Hiromitsu Kaneko, Yokohama (JP)

(73) Assignee: Institute of Technology Precision Electrical Discharge Work's (JP)

( * ) Notice: Subject to any disclaimer, the term of this patent is extended or adjusted under 35 U.S.C. 154(b) by 0 days.

(21) Appl. No.: 09/958,961

(22) PCT Filed: Feb. 15, 2001

(86) PCT No.: PCT/JP01/01074
§ 371 (c)(1),
(2), (4) Date: Oct. 10, 2001

(87) PCT Pub. No.: WO01/60597
PCT Pub. Date: Aug. 23, 2001

(65) Prior Publication Data
US 2002/0157236 A1 Oct. 31, 2002

(30) Foreign Application Priority Data
Feb. 15, 2000 (JP) .......................... 2000-036077

(51) Int. Cl.⁷ ............................................. B23P 23/00
(52) U.S. Cl. ...................... 29/564.7; 29/33 Q; 29/33 S; 409/144; 409/158; 409/230
(58) Field of Search ............... 29/33 Q, 33 S, 29/56.5, 564, 563, 33 P; 483/14–15; 409/158, 235, 144, 191, 230

(56) References Cited

U.S. PATENT DOCUMENTS

| | | | | |
|---|---|---|---|---|
| 3,099,873 A | * | 8/1963 | Brainard et al. | 483/14 |
| 4,654,957 A | * | 4/1987 | Powell et al. | 483/15 |
| 4,697,318 A | * | 10/1987 | Wickham et al. | 29/564 |
| 4,987,765 A | * | 1/1991 | Nishimura et al. | 29/563 |
| 5,271,140 A | * | 12/1993 | Futamura et al. | 29/33 K |
| 5,321,874 A | * | 6/1994 | Mills et al. | 29/563 |
| 5,361,485 A | * | 11/1994 | Baudermann | 29/563 |
| 5,678,446 A | * | 10/1997 | Futamura et al. | 72/404 |
| 5,819,395 A | * | 10/1998 | Faitel | 29/564 |
| 6,149,561 A | * | 11/2000 | Beecherl et al. | 483/1 |
| 6,439,813 B1 | * | 8/2002 | Repossini | 409/235 |

FOREIGN PATENT DOCUMENTS

| | | | | |
|---|---|---|---|---|
| DE | 36 39 011 | | 9/1987 | |
| JP | 4-17930 | | 1/1992 | |
| JP | 4-17998 | | 1/1992 | |
| JP | 5-104297 | | 4/1993 | |
| JP | 8-25160 | | 1/1996 | |
| JP | 2504605 | | 4/1996 | |
| JP | 10-309642 | | 11/1998 | |
| NL | 7811978 A | * | 6/1980 | 29/564 |
| NL | 7811981 A | * | 6/1980 | 29/564 |

* cited by examiner

Primary Examiner—A. L. Wellington
Assistant Examiner—Erica E Cadugan
(74) Attorney, Agent, or Firm—McGlew and Tuttle, P.C.

(57) ABSTRACT

An index-feed processing system that can reduce the machining cost of a product involving a plurality of machining processes is disclosed. The index-feed processing system comprises a plurality of processing units disposed in the longitudinal feeding direction of a workpiece corresponding to a plurality of processing processes so that the processing processes are performed sequentially as the workpiece is indexed. The processing unit body comprises a base plate and a support plate provided at a predetermined distance from the base plate, a slider provided movably between the base plate and the support plate in the direction orthogonally intersecting the base plate and the support plate, and a drive means for driving the slider. The processing units are formed as machining units so that machining operations can be performed by controlling the movement of the slider.

16 Claims, 9 Drawing Sheets

PROGRESSIVE PROCESSING DEVICE

TECHNICAL FIELD OF THE INVENTION

This invention relates to an index-feed processing system for performing punching, spinning, cutting, laminating and other processing operations on a piece of work by carrying out the processing operation of each process in a set of apparatuses, indexing the workpiece sequentially to the succeeding process to add a new processing operation onto the workpiece, and completing the entire processing operations in the final process.

BACKGROUND OF THE INVENTION

Manufacturing a sheet metal product of a predetermined shape by performing punching, spinning, compressing and other processing operations on a sheet metal material comprising a structural material, such as a steel sheet has heretofore normally involved several processes. When a large quantity of such sheet metal products are involved, a commonly used manufacturing practice is such that a processing operation of each manufacturing process or stage is performed individually on a workpiece in a single piece of processing die, the workpiece is indexed sequentially to the next step to add a new processing operation, and the processing operation is completed in the final stage. This type of processing die, which is called the progressive die, has the advantage of extremely high efficiency since a piece of sheet metal product can be obtained in each stamping operation of a press, for example.

The conventional type of index-feed processing die as described earlier has the advantages of high production rate, short delivery time from the input of a workpiece to the completion of the entire processing operations, less work-in-process required in the intermediate steps of a press working process, and mass production with a small number of operators. It has the following problems, on the other hand. That is, since its construction involves multiple pairs of punch and die in a single mold, the mold construction is extremely complex, requiring high-precision mold manufacturing technology, long manufacturing period, and an enormous amount of manufacturing cost.

Furthermore, repairing and/or adjustment of a partially damaged mold requires disassembly of the entire mold. These complex operations require a large amount of time and labor. In addition, when a system of manufacturing special molds has to be adopted to meet slightly different requirements in terms of the shape and dimensions of specific workpieces in a large-item small-scale production system, mold cost is unwantedly increased, making it impossible to adopt the so-called flexible manufacturing system (FMS) which is increasing in popularity in recent years.

To solve these problems, the present applicant filed patent applications for index-feed metal processing systems of a simple construction that can accommodate partial adjustment (Japanese Patent Application No. Hei-2(1990)-121760 now Japanese Pat. No. 4-17930, Japanese Patent Application No. Hei-2(1990)-121761 now Japanese Patent 4-17998, etc., for example).

Figure 11:
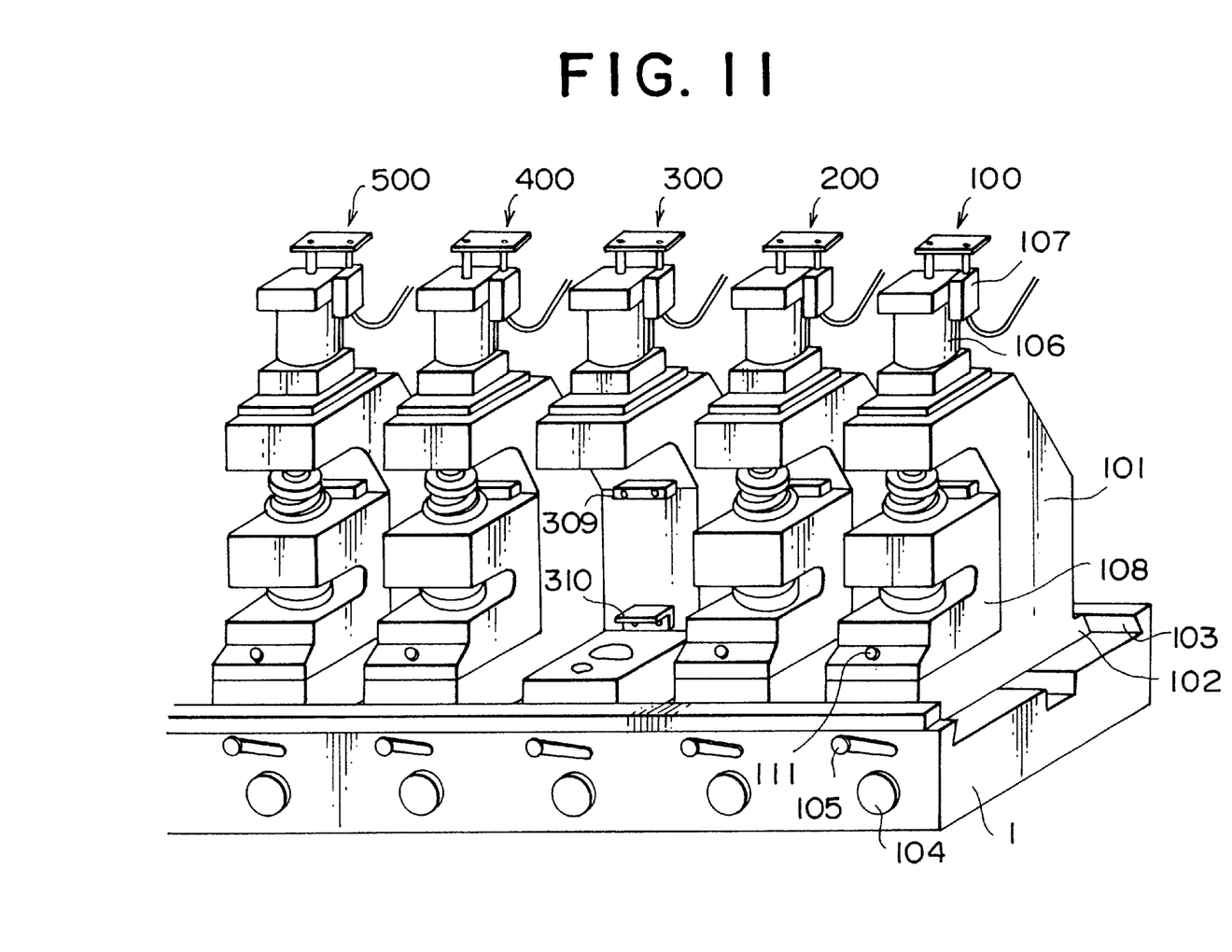
FIG. 11 is a perspective view showing an example of the index-feed processing system on which the present invention is based.

FIG. 11 is a perspective view of an example of an index-feed metal processing system on which the present invention is based. In FIG. 11, numerals 100~500 denote processing units disposed on a base 1 at intervals of 2 P (P denotes the feeding pitch of a workpiece (not shown)), for example, in the feeding direction of the workpiece. Each of the processing units 10~500 has a pair of punch and die corresponding to a plurality of processing processes, which will be described in the following, taking the processing unit 100 as an example.

Numeral 101 refers to a processing unit body formed into a virtually U shape, having a dovetail 102 integrally formed at the lower end thereof that engages with a dovetail groove 103 provided on the base 1 so that adjustment can be made to permit the body 101 to move in the feeding direction of the workpiece while restricting the movement of the body 101 in the direction normal to the feeding direction of the workpiece. Numeral 104 refers to a movement adjusting device, and 105 to a clamp. Numeral 106 refers to a hydraulic cylinder provided on the upper end of the body 101, and 107 to a position measuring device provided on the side surface of the hydraulic cylinder 106.

Numeral 108 refers to a cassette formed into a virtually U shape, provided detachably on the body 101 and having a punch or die (neither of them shown) provided vertically movably on the upper part thereof, and a die or punch that is the counterpart of the aforementioned punch or die provided on the lower part thereof. The cassette 108 is positioned by causing it to engage with positioning members 309 and 310, as shown in the processing unit 300 in the figure. Numeral 111 refers to a clamp screw.

That is, the cassette 108 can be positioned by mounting it on the body 101 via the positioning members (not shown. Refer to numerals 309 and 310 in the processing unit 300), and locked in position by tightening the clamping screw 111. After the cassette 108 has been locked, an actuating rod (not shown) of the hydraulic cylinder 106 is connected to the aforementioned vertically movable punch or die.

Figure 12:
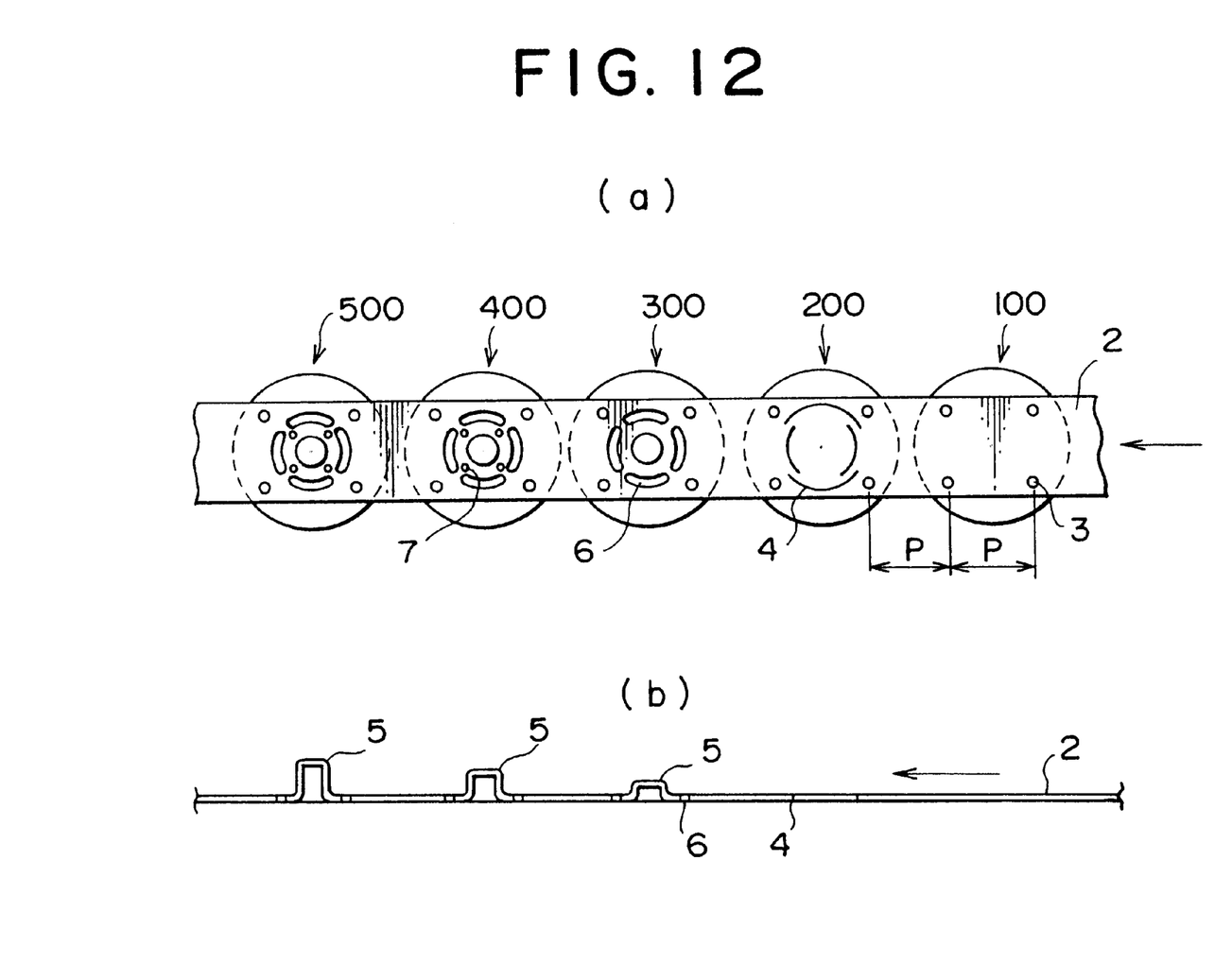
FIG. 12 is a diagram of assistance in explaining the state of machining of a workpiece; (a) being a plan view, and (b) a cross-sectional view thereof, respectively.

FIG. 12 is a diagram of assistance in explaining the state of processing the workpiece, (a) being a plan view and (b) a cross-sectional view thereof. Like parts are shown by like numerals used in FIG. 11. In FIG. 12, numeral 2 refers to a workpiece that is indexed intermittently at a pitch P in the direction shown by an arrow. That is, the workpiece 2 is indexed between a pair of punch and die provided on the cassette 108 (the same applies to the other cassettes), as shown in FIG. 11. In FIGS. 11 and 12, the processing units 100~500 are formed in such a manner as to correspond to a processing process for providing pilot holes 3, a processing process for providing arc-shaped slits 4, and first through third drawing processes.

The processing unit 100 has a punch and die for providing pilot holes 3, and guides (not shown) for engaging with the pilot holes 3 provided at position P on the downstream side in the feeding direction of the workpiece 2. As a result, as the processing unit 100 is operated and the pilot holes 3 are provided one after another, the guides are engaged with the pilot holes 3, based on which subsequent positioning and processing are performed to prevent the workpiece 2 from unwantedly shifting in position, thereby maintaining precision.

Next, arc-shaped slits 4 are machined in the processing unit 200, and a first drawing operation is performed in the processing unit 300 to form cup-shaped projections 5 on the workpiece 2, while the arc-shaped slits 4 expands in width, turning into arc-shaped grooves 6. In the processing unit 400, moreover, a second drawing operation is performed and flange holes 7 are machined, with the result that the height of the projections is increased. In the processing unit 500, a third drawing operation is carried out to form the height of the projections 5 into a predetermined size.

Subsequently, trimming and other operations are performed, though not shown in the figure, to obtain a sheet metal product of a predetermined shape. Needless to say, positioning is carried out in the processing units 200~500, too, to maintain predetermined precision by providing guides for engaging with the pilot holes 3.

The index-feed processing system of the aforementioned construction has the advantages of a simpler construction than that of the conventional progressive dies, ease of manufacture, and high-efficient processing accomplished even in a large-item small-scale production system. But it has the following disadvantages.

That is, since the conventional index-feed processing system normally involves workpiece of a strip shape, most system of this type are chiefly designed to carry out bending, drawing, blanking, piercing and other sheet-metal processing operations. It is usually difficult for such index-feed metal processing systems to perform machining operations, such as threading, for example, on part of a product. In such a case, therefore, threading and other machining operations are additionally carried out upon completion of the index-feed metal processing operations, resulting in increased cost.

The index-feed metal processing system usually involves a large number of products per production lot since products obtained by index-feed metal processing are mostly small items, and are manufactured continuously. Additional machining on such large-volume products not only requires special-purpose processing jigs but also extra time and labor for mounting and removing products on and from such jigs. This not only leads to increased processing cost, but involves difficulty in improving dimensional accuracy of processed parts due to variability of datum surface.

To solve these problems, the present applicant filed patent applications on inventions for providing a machining means on the intermediate part of a given processing unit in such a manner as to be accessible and detachable to and from the workpiece, and for providing given processing units on a multi-spindle machining unit having a plurality of spindles so as to permit a plurality of machining operations (Japanese Patent Application Nos. Hei-3(1991)-269833 and Hei-6 (1994)-169120).

With the above-mentioned construction, a long-sized, strip- or hoop-shaped workpiece incorporating therein different portions to be formed into products can be subjected to a plurality of machining ranging from internal and external threading, to drilling, countersinking, chamfering, spot facing, staking, marking, etc. simultaneously in a single process, thereby reducing manhours and improving dimensional accuracy.

In the aforementioned system, however, there still remain several problems. That is, since the aforementioned machining means or multi-spindle machining unit has a separate construction from that of the press working unit, separate machining units have to be provided every time different types of machining operations are to be carried out. This lack of interchangeability in the entire system necessitates replacement of the entire index-feed processing system, requiring excess time and labor for mounting and removing the system.

Machining with the aforementioned machining unit generally takes longer hours compared with press working, extending the machining tact time for the entire system, leading to lowered productivity.

To machine a workpiece having a plurality of portions being machined, on the other hand, a machining center having a plurality of machining tools is especially effective. Even in this case, machining time for each process or stage tends to become comparatively longer. Furthermore, when the machining process is divided into a plurality of processes, a plurality of expensive machining centers have to be provided, increasing equipment cost for the entire system.

DISCLOSURE OF THE INVENTION

The present invention is intended to overcome the problems inherent in the prior art, and it is an object of the present invention to provide an index-feed processing system that can reduce processing cost of products involving a plurality of machining processes.

To solve the above problems, the first invention adopts a technical means involving an index-feed processing system where a plurality of processing units having cassettes incorporating machining means and detachably mounted on a unit body are disposed at intervals of mP (m being a given positive integer, and P being an index-feeding pitch of workpiece) in the longitudinal feeding direction of a long-sized workpiece corresponding to a plurality of processing processes so that the processing processes can be sequentially performed with the processing units on the index-fed workpiece; the improvement comprising the unit body formed by a base plate, a support plate provided at a predetermined distance from the base plate, a slider provided between the base plate and the support plate movably in a direction orthogonally intersecting the base plate and the support plate, and a drive means for driving the slider, and the processing units formed as machining units so that machining operations can be performed continuously by controlling the movement of the slider.

The second invention adopts a technical means involving an index-feed processing system where a plurality of processing units having cassettes incorporating machining means and detachably mounted on a unit body are disposed at intervals of mP (m being a given positive integer, and P an index-feeding pitch of workpiece) in the longitudinal feeding direction of a long-sized workpiece corresponding to a plurality of processing processes so that the processing processes can be sequentially performed with the processing units on the index-fed workpiece; the improvement comprising the unit body formed by a base plate, a support plate provided at a predetermined distance from the base plate, a slider provided between the base plate and the support plate movably in a direction orthogonally intersecting the base plate and the support plate, and a drive means for driving the slider, and a given number of the processing units formed as machining units and the other processing units formed as press working units so that processing, including machining and press working operations, can be performed continuously by controlling the movement of the slider.

In the above inventions, the base plate and the support plate may be disposed in parallel with the horizontal plane, and the slider may be formed movably in the vertical direction.

Furthermore, the drive means in the above inventions may be a mechanism including a servomotor and a screw pair. In this case, the screw pair may be a ball screw.

Moreover, the slider in the above inventions may be formed in such a manner as to slide along a guide bar provided between the base plate and the support plate.

Furthermore, the cassette of the machining unit in the above inventions may be formed by a holder that can detachably and rotatably hold a tool, and an XY table for moving the holder in the direction orthogonally intersecting the traveling direction of the slider. In this case, the drive means of the XY table may be formed by a linear motor.

BEST MODE FOR CARRYING OUT THE PRESENT INVENTION

Figure 1:
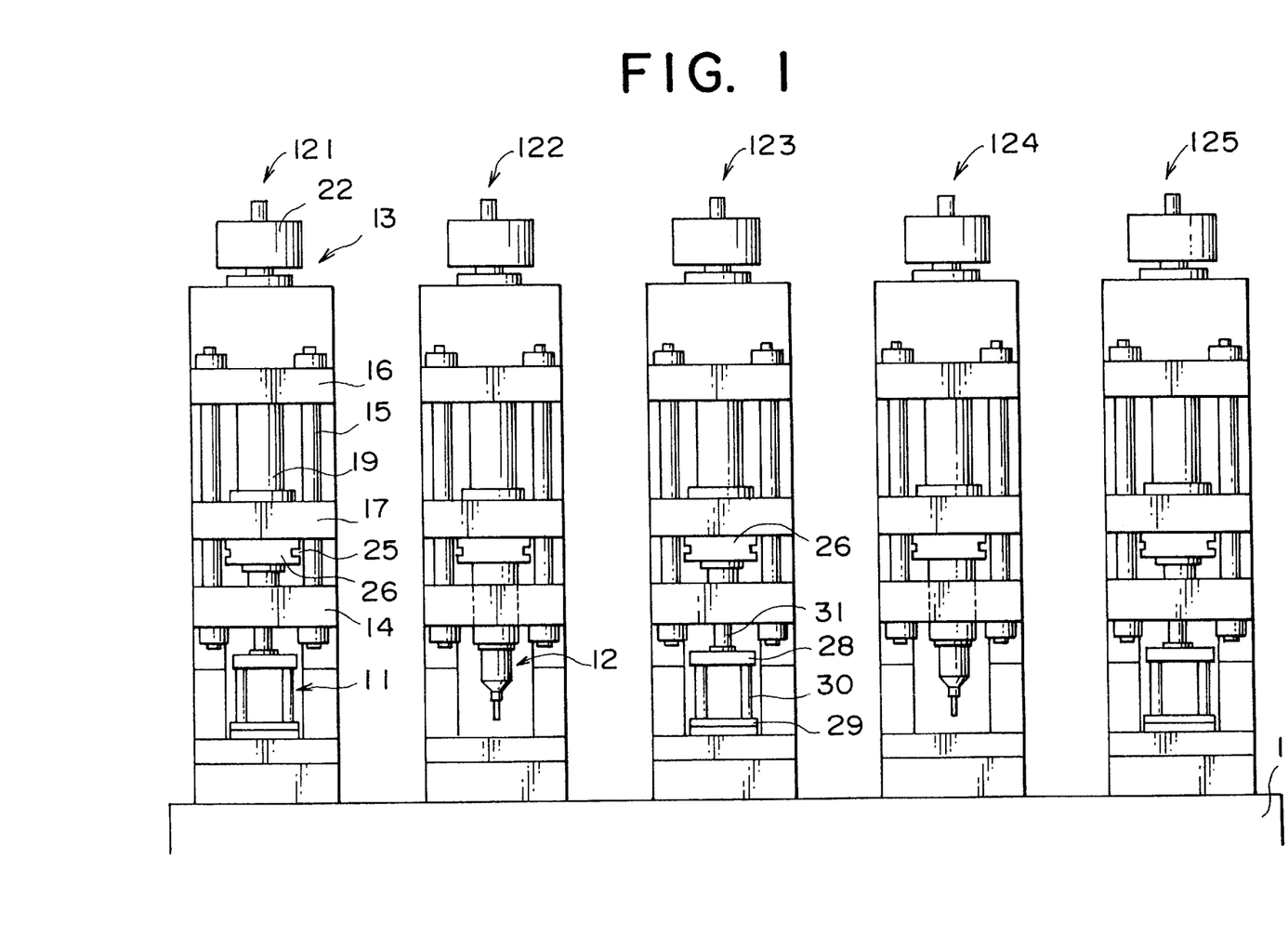
FIG. 1 is a front view illustrating a mode of operation of the present invention.
Figure 2:
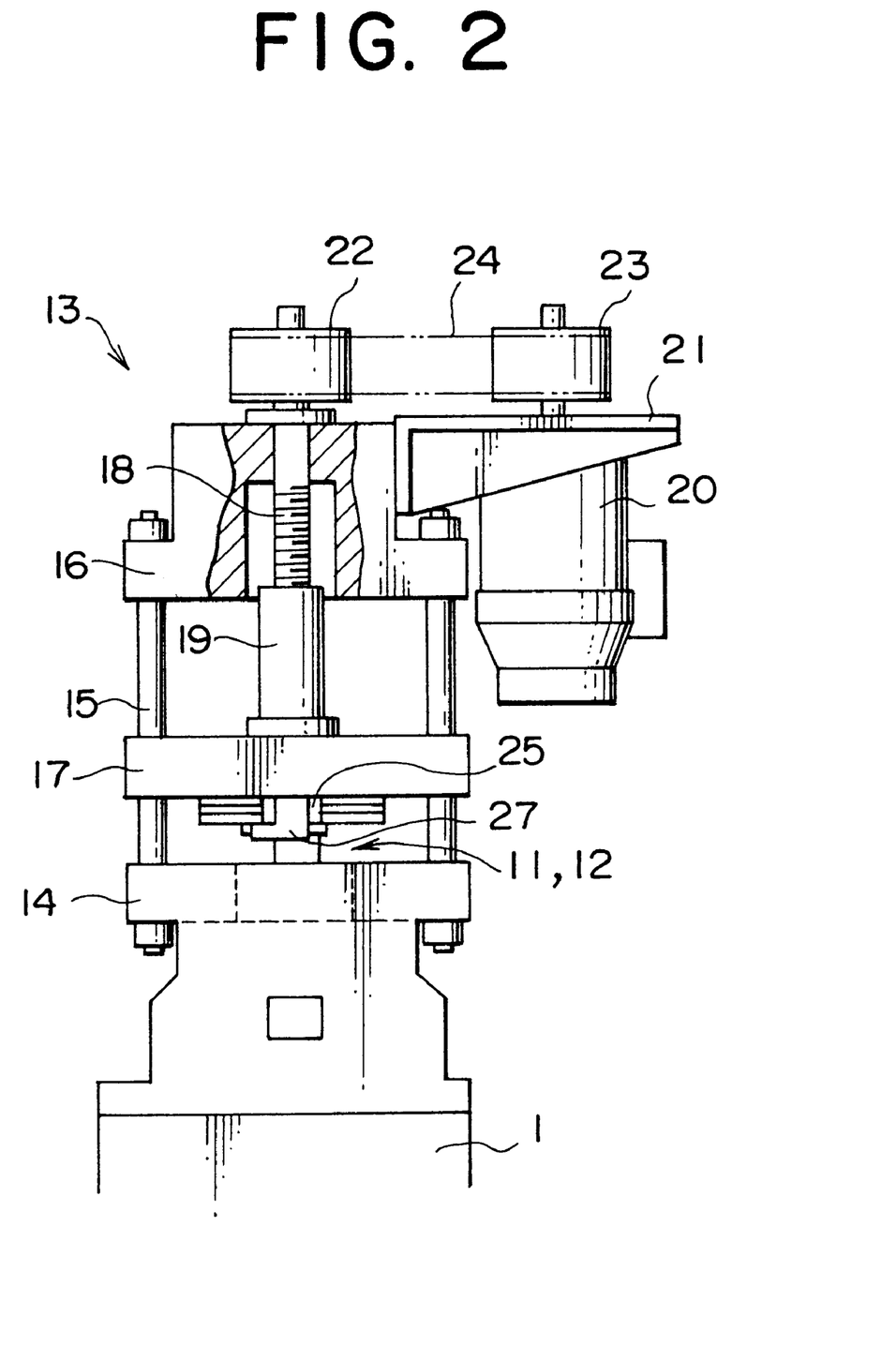
FIG. 2 is a partially cross-sectional side view illustrating a mode of operation of the present invention.

FIGS. 1 and 2 are a front view and a partially cross-sectional side view of a mode of operation of the present invention. In the figures, numerals 121~125 refer to processing units disposed on a base 1 at intervals (intervals on the processing center line of the processing units 121~125) of mP (m being a positive integer, and P an index-feed pitch of workpiece) in the longitudinal feeding direction of a long-sized workpiece (not shown), starting from the left in FIG. 1, for example.

In the processing units 121~125, cassettes 11 and 12 having such processing means-as to be capable of performing processing operations corresponding to a plurality of processing processes are detachably provided. That is, the cassette 11 has a press working means, and the cassette 12 has a machining means, respectively, and the processing units 121, 123 and 125 are formed as press working units, and the processing units 122 and 124 as machining units, respectively. The number of processing units to be installed and the number of processing means to be incorporated in the cassette are determined appropriately, depending on the required types of processing and processing processes. FIG. 1 shows an example where three processing units 121, 123 and 125, and two machining units 122 and 124 are disposed alternately.

Next, numeral 13 refers to a unit body comprising a base plate 14, a guide bar 15 provided upright on the base plate 14, a support plate 16 provided on the upper end of the guide bar 15, and a slider 17 that is vertically slidable along the guide bar 15. Numeral 18 refers to a threaded shaft provided on the support plate 16 in such a manner as to be rotatable in forward and reverse directions and form a screw pair by engaging with a nut member 19 provided on the slider 17. This screw pair may be of a square or triangular thread, and more preferably should be of a recirculating ball lead screw.

Numeral 20 refers to a motor provided on the support plate 16 via a bracket 17 in such a manner as to cause the threaded shaft 18 to rotate in forward and reverse directions via a motor pulley 22, a pulley 23 provided on the threaded shaft 18 and a timing belt 24. The motor 20 should preferably be an NC servomotor, for example. Numeral 25 refers to a mounting member provided on the lower end of the slider 17 in such a manner that the cassettes 11 and 12 can be attached and detached by engaging a pair of protruded ridges provided on the lower part of the slider 17 and extending horizontally, for example, with recessed grooves on a mounting member provided on the upper end of the cassettes 11 and 12. Numeral 27 refers to a clamping device for locking the positioned cassettes 11 and 12 at predetermined positions.

Now, the construction of the cassette 11 will be described in the following. The cassette 11 comprises a top plate 28, a bottom plate 29, a guide bar 30, a actuating member 31 for moving the top plate 28 vertically, and the aforementioned mounting member 26. That is, a pair of top and bottom molds constituting a metal mold, or a pair of punch and die constituting a punching die, for example, are installed on the top and bottom plates 28 and 29 to perform punching, spinning, compressing and other predetermined press working operations.

Figure 3:
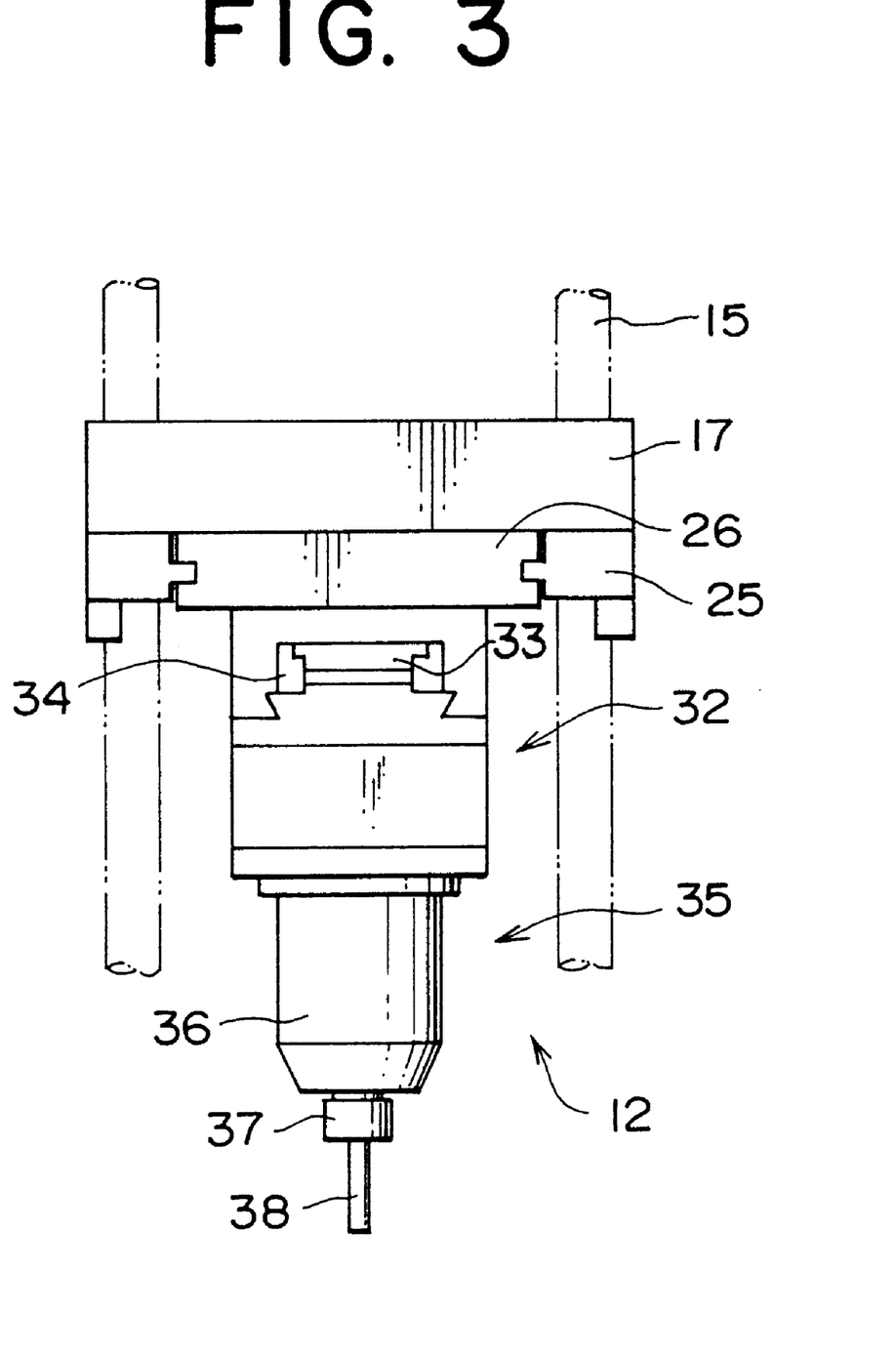
FIG. 3 is an enlarged front view of the cassette 12 in FIGS. 1 and 2.
Figure 4:
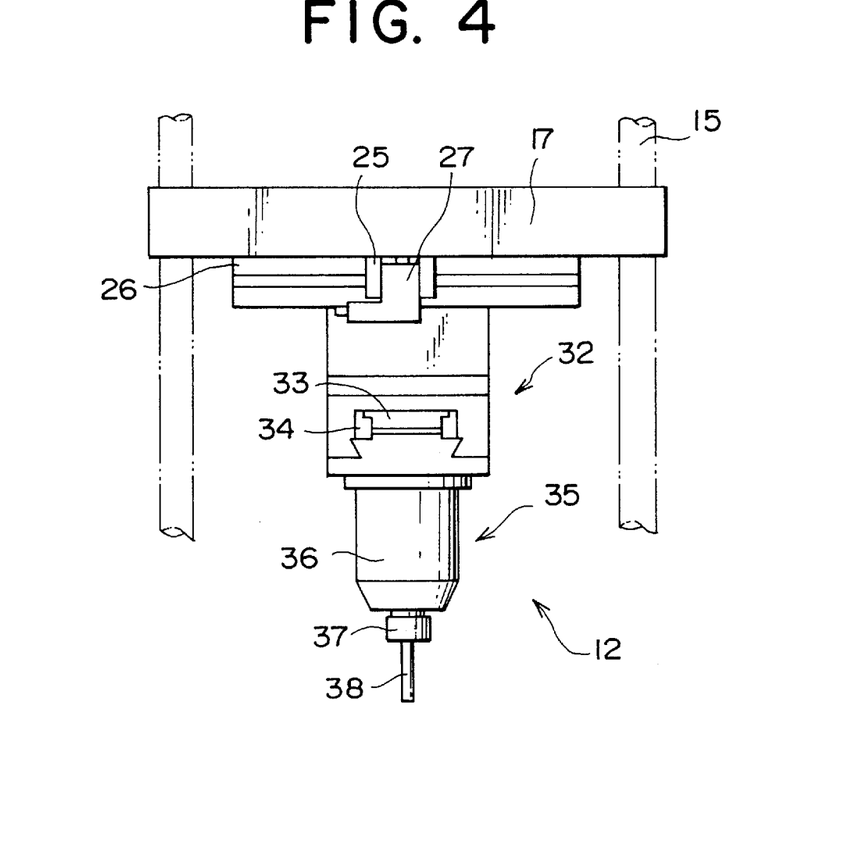
FIG. 4 is an enlarged side view of the cassette 12 in FIGS. 1 and 2.

FIGS. 3 and 4 are partially enlarged front and side views of the cassette in FIGS. 1 and 2. Like parts are indicated by like reference numerals in FIGS. 1 and 2. In FIGS. 3 and 4, numeral 32 refers to an KY table provided on the lower part of the mounting member 26 in such a manner as to be movable in the direction (horizontal direction in this case) orthogonally intersecting the traveling direction of the slider 17 (in the vertical direction in this case). As a drive means for the XY table 32 a linear motor is effective, which may be of a moving coil type comprising a stator 33 having N and S magnetic poles arranged alternately in the traveling direction, for example, and a moving element 34 comprising a coil provided in the magnetic field of the stator 33, or of a moving magnet type comprising a reversed combination.

Numeral 35 refers to a holder provided on the lower part of the XY table 32 and comprising a motor 36, such as a high-speed spindle motor, and a chuck provided on the main spindle of the motor 36. Numeral 38 refers to a tool that can be attached to and detached from the chuck 37. The tool 38 may be a drill, end mill, grinding stone or any other rotary cutting tool. If the motor 36 is of a variable-speed type, a reamer, machine tap and other low-speed rotary tools can also be used.

Figure 5:
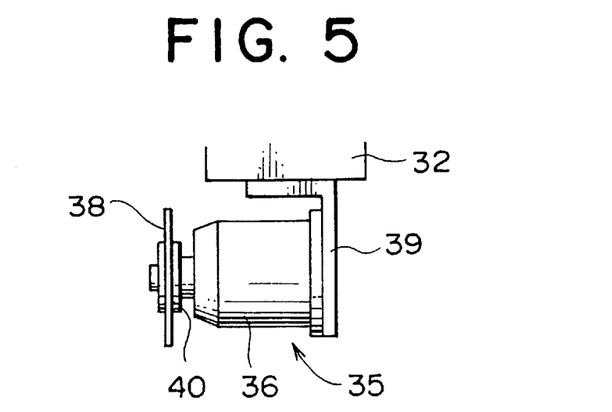
FIG. 5 is a front view illustrating a modified example of the holder 35 in FIGS. 3 and 4.

FIG. 5 is a front view showing a variation of the holder 35 in FIGS. 3 and 4. In FIG. 5, the holder 35 is provided on the XY table 32 via the bracket 39, and disposed in such a manner that the axis of the motor 36 is in parallel with the horizontal plane. On the spindle thereof mounted is a disc-shaped tool 38, for example, via a support fixture 40. Such a tool may be a milling cutter, fluting cutter, grinding stone, etc.

With the above-mentioned construction, as a hoop-shaped, long-sized workpiece (not shown), for example, is sequentially indexed to the processing units 121~125 via an indexing device (not shown) in FIG. 1, for example, pilot holes as datum holes are first formed on the workpiece in the processing unit 121 using a punch and die (both not shown. The same applies hereinafter.) provided on the cassette 11 as the slider 17 descends.

In the processing unit 122, guides are engaged with the pilot holes provided on the workpiece, and predetermined machining is performed by a machining means provided on the cassette 12, using the pilot holes as guides. Similarly, a first press working operation, a second machining operation and a second press working operation are sequentially performed in the processing units 123~125. Consequently, productivity can be improved through the reduction of the time required for processing by dividing the whole processing of the workpiece into a plurality of processes, particularly subdividing machining processes, and equalizing processing time wherever possible by carrying out the processing processes with a plurality of processing units.

In the aforementioned index-feed processing where the slider 17 is caused to move under control by using an NC servomotor, for example, as the motor 20, not only press working but also machining involving controlled feeding can be satisfactorily cope with. In the machining units 122 and 124, the three-dimensional movement of the tool 38 is made possible since the tool 38 can be moved in the horizontal plane by the aid of the XY table, in addition to the vertical movement of the slider 17, meeting the machine tool requirements in terms of tool carrying functions.

That is, since the slider 17 can accomplish quick vertical movement by the aid of the motor 20 via the threaded shaft 18 and the nut member 19, a predetermined press working can be performed by operating a press working means provided on the cassette 11. In the case of the machining unit, on the other hand, a predetermined machining can be performed by quick feeding the slider 17 to cause a machining means provided on the cassette 12 to quickly approach to a portion being machined on a workpiece, and causing the XY table 32 to move as necessary through controlled feeding by the motor 20.

The basically common construction of the unit body comprising the processing units 121~125 enables tooling changes merely by changing the cassettes 11 and 12, making it easy to set up index-feed processing processes. As a result, even when processing small lots of a wide variety of products, down time due to retooig can be substantially reduced, leading to improved operational efficiency.

In the foregoing, description has been made on a so-called vertical type embodying the invention where the base plate 14 and the support plate 16 are disposed in parallel with the horizontal plane, and the guide bar 15 connecting both is provided in the vertical direction. The present invention can also be applied to a so-called horizontal type where the base plate 14 and the support plate 16 are disposed in parallel with the vertical plane, and the guide bar 15 is disposed in the horizontal direction.

A plurality of guide bars 15 for guiding the movement of the slider 17 should preferably be provided for machining operations involving large-size workpieces or those requiring rigidity, but a single workpiece may serve the purpose. In some cases, the guide bar should be formed into a columnar or beam shape along the side of which the slider 17 slides.

Furthermore, although an example has been shown in the foregoing description where the processing unit comprises a press working unit and a machining unit, the present invention can include a heat treatment needed for deep drawing, a surface treatment for surface modification, a laminating operation for manufacturing profile, or odd-shaped components, in addition to the press working unit. Moreover, the entire processing units can be composed of machining units.

(Embodiment 1)

Figure 6:
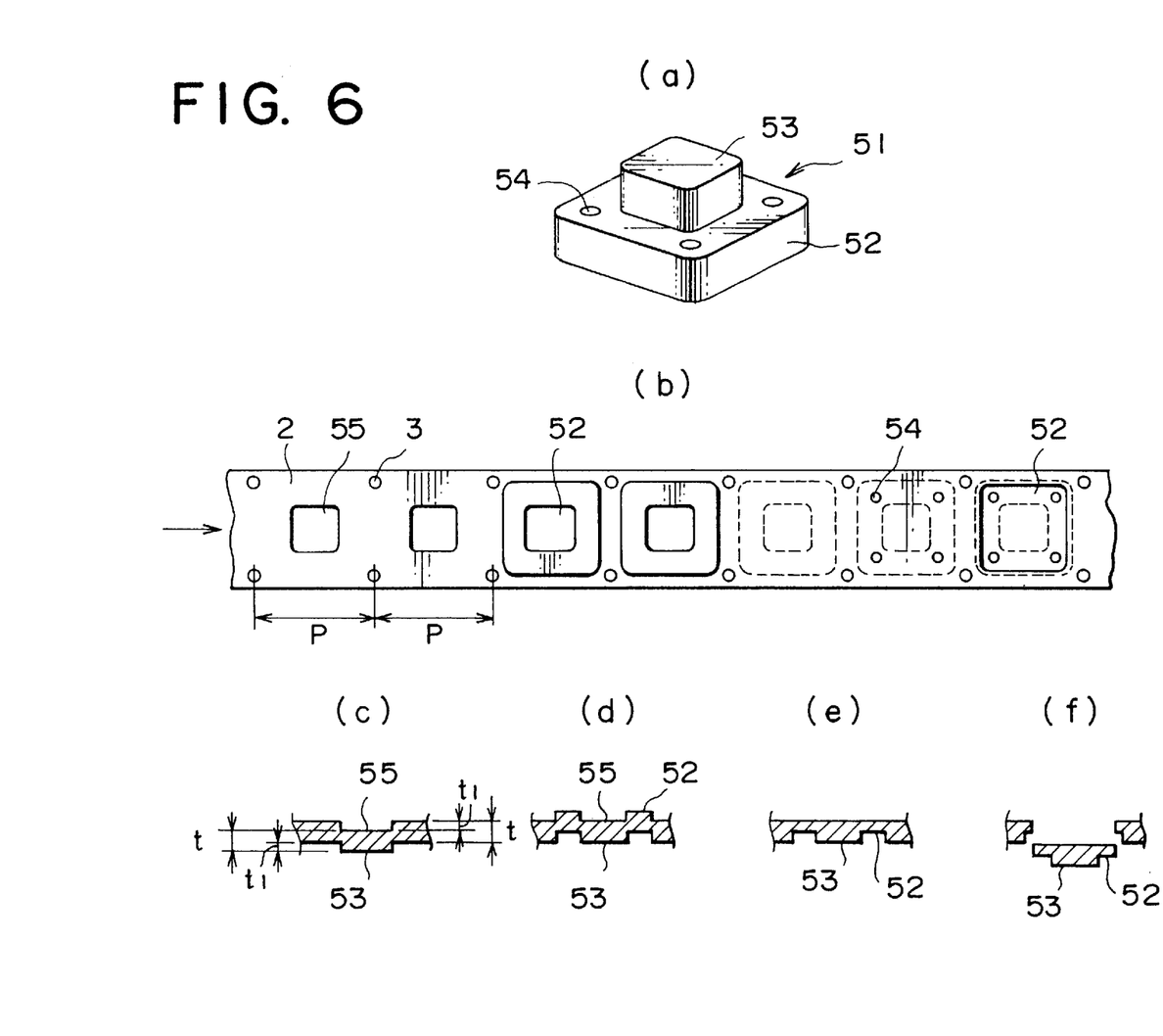
FIG. 6 is a diagram of assistance in explaining a first embodiment of processing in the index-feed processing system according to the present invention; (a) being a perspective view of a workpiece, (b) a plan view showing the state of processing of the workpiece, and (c)~(d) cross-sectional views of the workpiece, respectively.

FIG. 6 is a diagram of assistance in explaining the first embodiment of processing using the index-feed processing system according to the present invention; (a) being a perspective view showing a workpiece, (b) being a plan view showing the state of processing the workpiece, and (c)~(f) cross-sectional views of the workpiece, respectively. Like parts are indicated by like numerals using in FIG. 12.

As shown in FIG. 6, a product being processed 51 has a projection 53 of a square shape, for example, at the center of a pedestal 52 of a square shape, for example; the pedestal 52 having through holes 54 at the four corners thereof.

To obtain the product being processed 51, a hoop-shaped, long-sized workpiece 2 is intermittently indexed at the pitch of P in the direction shown by an arrow, as shown in FIG. 6 (b), pilot holes that serve as datums are provided (either of press working or machining may be used) in a first processing unit (not shown, the same applies hereinafter.), the projection 53 is half-blanked in the state where guides (as provided in the processing unit. The same applies hereinafter.) are engaged with the pilot holes 3 in a second processing unit. That is, a recess 55 having a depth equal to the height t1 (t1<t) of the projection 53 with respect to the thickness of the workpiece 2 is formed with a punch.

Next, the pedestal 52 is half-blanked in a third processing unit in the state where the guides are engaged with the pilot holes 3, as in the second processing unit.

Furthermore, the workpiece 2 is indexed, and the bottom surface of the pedestal 52 is cut (or milled) to make the bottom surface flush with the recess 55. As a cutting tool for this machining, an end milling cutter may be used, but a plain or face milling cutter is more preferable. When the surface being machined is a large area, the machining process should preferably be divided into a plurality of processes, and a plurality of machining units be used to reduce the entire processing tact time.

Furthermore, the machining operation may be divided into rough, intermediate and finish machining operations.

In a fifth processing unit, through holes 54 are provided at the four corners of the pedestal 52 with a punch and die, and the pedestal 52 is blanked in the final sixth processing unit to complete the entire processing.

In FIG. 6, description has been made about the pedestal 52 and the projection 53 whose projected outline is a square shape, but the present invention is not limited to it, and can be applied to triangular, rectangular, circular, oval and other geometrical shapes.

(Embodiment 2)

Figure 7:
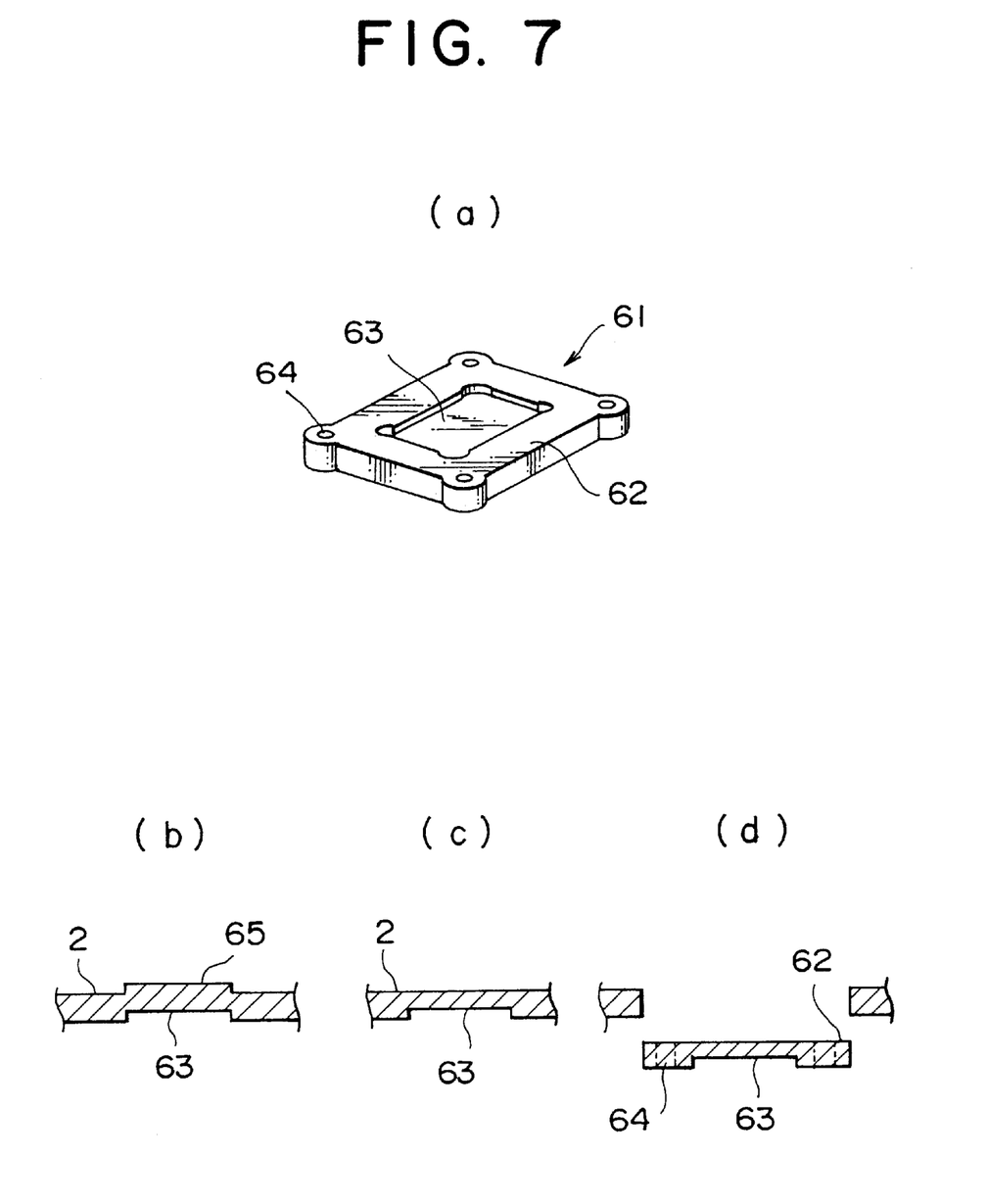
FIG. 7 is a diagram of assistance in explaining a second embodiment of processing in the index-feed processing system according to the present invention; (a) being a perspective view of a workpiece, and (b)~(d) cross-sectional views showing the state of processing of the workpiece in the processing processes, respectively.

FIG. 7 is a diagram of assistance in explaining the second embodiment of a product being processed in the index-feed processing system according to the present invention; (a) being a perspective view, and (b)~(d) cross-sectional views showing the state of processing in the processing processes of a workpiece, respectively. In FIG. 7, a product being processed 81 has a recess 63 at the center of an almost rectangular contour part 62, and through holes 64 at the four corners thereof.

To form the product being processed 61 of such a shape, pilot holes (not shown) are first punched sequentially on a workpiece 2, as in the workpiece 2 shown in FIG. 6, the recess 63 is then half-blanked in the first processing unit in the state where guides are engaged with the pilot holes. With this, a projection 65 of a shape corresponding to the recess 63 is formed on the top surface of the workpiece 2. In this processing, the punch for forming the recess 63 is disposed on the downside of the processing unit, and the die for forming the projection 65 on the upside.

Next, the projection 65 is cut (or milled) in the second processing unit to make the top surface of the workpiece 2 flush with the original top surface of the workpiece 2 to form the bottom surface of the product being processed 61. In the third processing unit, through holes 64 are pierced, and the contour part 62 is blanked in the final fourth processing unit to complete the entire processing. In this case, the piercing of the through holes 64 and the blanking of the contour part 62 can be carried out simultaneously in the same processing unit.

(Embodiment 3)

Figure 8:
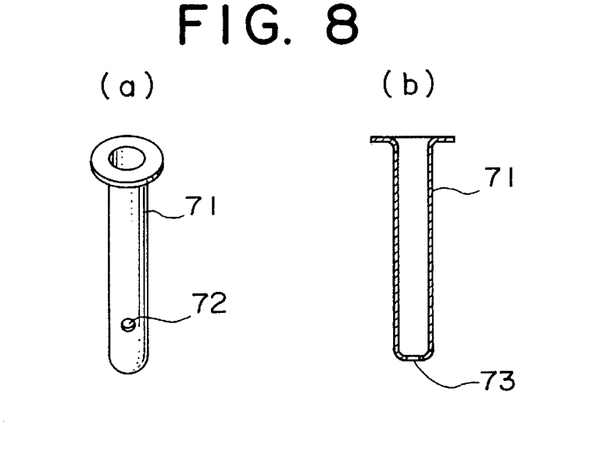
FIG. 8 is a diagram of assistance in explaining a third embodiment of the workpiece in the index-feed processing system according to the present invention; (a) being a perspective view, and (b) a longitudinal section, respectively.

FIG. 8 is a diagram of assistance in explaining a third embodiment of a product being processed in the index-feed processing system according to the present invention; (a) being a perspective view and (b) a longitudinal sectional view. In FIG. 8, a product being processed 71 is formed in a plurality of deep drawing operations from a metal sheet as a workpiece into a bottomed hollow tubular shape, on part of which a horizontal hole 72 and a vertical hole 73 are provided. The product being processed 71 of such a shape can be formed using an index-feed processing system comprising a combination of a plurality of press working units and two machining units having drills on horizontal and vertical spindles. The vertical hole 73 which is concentric with the axis of the product being processed 71 can be formed with a punch and die in the press working unit.

(Embodiment 4)

Figure 9:
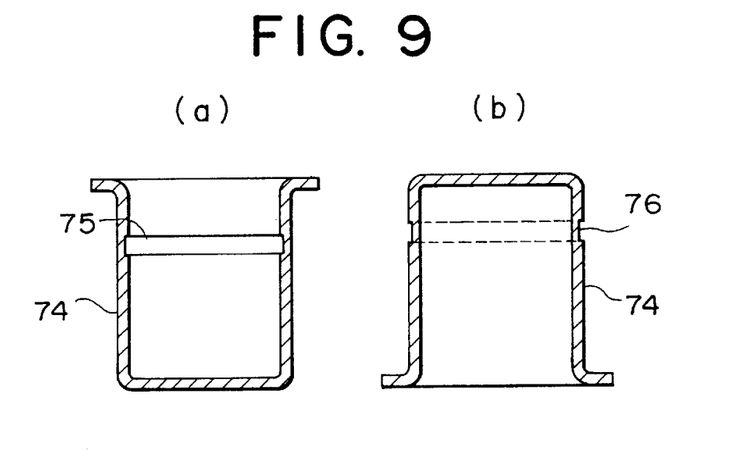
FIG. 9 is a diagram of assistance in explaining a fourth embodiment of the workpiece in the index-feed processing system according to the present invention; (a) showing the workpiece having an internal groove, and (b) showing that having a notch, respectively.

FIG. 9 is a longitudinal sectional view showing a fourth embodiment of a product being processed in the index-feed processing unit according to the present invention; (a) being the product with an inside groove and (b) that with an outside groove. In FIG. 9, a product being processed 74 is formed into a bottomed hollow tubular shape with a plurality of press working units, and an inside groove 75 or outside groove 76 is formed with a machining unit.

In this case, a cassette 12 provided on the machining unit uses as a tool 38 a T-groove milling cutter, for example, in FIGS. 3 and 4, and is operated in such a manner that the axial line of the T-groove milling cutter follows a circular track around the axial line of the product being processed 74.

(Embodiment 5)

Figure 10:
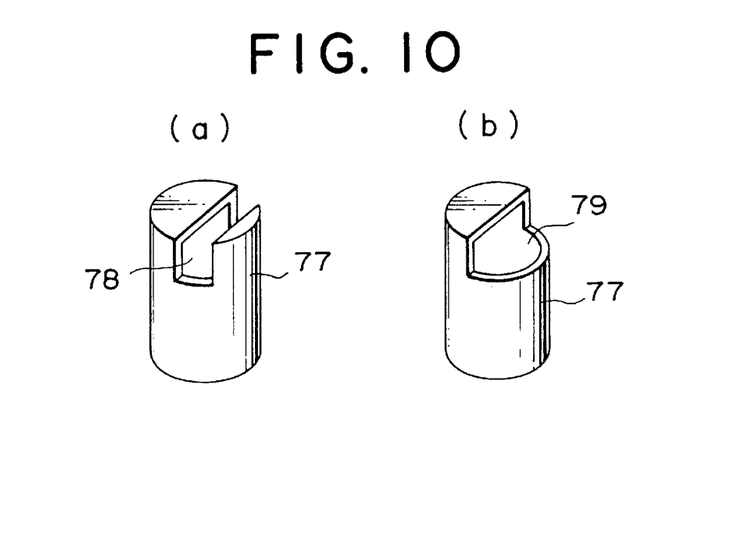
FIG. 10 is a diagram of assistance in explaining a fifth embodiment of the workpiece in the index-feed processing system according to the present invention; (a) showing the workpiece having a groove, and (b) showing that having a notch, respectively.

FIG. 10 is a perspective view showing a fifth embodiment of a product being processed in the index-feed processing system according to the present invention; (a) showing the product having a groove, and (b) that having a notch. In FIG. 10, the product being processed 77 is formed into a bottom hollow tubular shape with a plurality of press working units, as in the case of the product being processed 74, and a groove 78 or a notch 79 is formed with a machining unit.

INDUSTRIAL APPLICABILITY

The present invention having the aforementioned construction and operations can accomplish the following effects.

1. In the index-feed processing of a workpiece, a plurality of machining operations, or a combination of these machining operations and a plurality of press working operations can be carried out in succession and simultaneously. This leads to high processing efficiency and enables cost reductions.

2. Compared with a system where after a workpiece is formed into a product with processing operations, including press working, remaining machining operations are carried out on it, the system embodying the present invention not only eliminates the need for manufacturing processing jigs, but also can save extra time and labor for mounting and removing the workpiece and improve dimensional accuracy as well.

3. The unit body comprising a processing unit can be applied in common to press working and machining units, and tool changing is possible merely by changing cassettes. This leads to improved operational efficiency of the entire system.

4. Since the entire processing processes can be divided into a plurality of processes, mold cost can be substantially reduced and system components can be easily assembled.

What is claimed is:

1. An index-feed processing system comprising a plurality of processing units, in which units cassettes having processing means are detachably provided in respective unit bodies thereof, which units are disposed at intervals of mP, m being a positive integer, and P a feed pitch of a workpiece, in a longitudinal direction of a workpiece corresponding to a direction of feed of the workpiece, said processing units performing a plurality of processing processes, so that the processing processes are performed sequentially as the workpiece is indexed at the aforementioned pitch;

the improvement being such that each unit body comprises a base plate, a support plate provided at a predetermined distance from the base plate, a slider movably provided between the base plate and the support plate in the direction orthogonally intersecting with the base plate and the support plate, and a drive means for driving the slider;

wherein at least one of the detachable cassettes includes an XY table connectable to a respective slider for movement therewith via a means for detachably connecting the XY table to the respective slider, on which XY table is mounted a holder for detachably holding and rotating a tool, and which XY table can move the holder in the direction orthogonally intersecting the slider traveling direction.

2. An index-feed processing system as set forth in claim 1 wherein in each unit body, the base plate and the support plate are disposed in parallel with the horizontal plane, and the slider is provided vertically movably.

3. An index-feed processing system as set forth in claim 2 wherein the drive means is a mechanism including a servomotor and a screw pair.

4. An index-feed processing system as set forth in claim 3 wherein the screw pair is a recirculating ball lead screw.

5. An index-feed processing system as set forth in claim 1 wherein the drive means is a mechanism including a servomotor and a screw pair.

6. An index-feed processing system as set forth in claim 5 wherein the screw pair is a recirculating ball lead screw.

7. An index-feed processing system as set forth in claim 1 wherein in each unit body, the slider is adapted so as to slide along a guide bar provided between the base plate and the support plate.

8. An index-feed processing system as set forth in claim 1 wherein a drive means for driving the XY table is a linear motor.

9. An index-feed processing system comprising a plurality of processing units, in which units cassettes having processing means are detachably provided in respective unit bodies thereof, which units are disposed at intervals of mP, m being a positive integer, and P a feed pitch of a workpiece, in a longitudinal direction of a workpiece corresponding to a direction of feed of the workpiece, said processing units performing a plurality of processing processes, so that the processing processes are performed sequentially as the workpiece is indexed at the aforementioned pitch;

the improvement being such that each unit body comprises a base plate, a support plate provided at a predetermined distance from the base plate, a slider movably provided between the base plate and the support plate in the direction orthogonally intersecting with the base plate and the support plate, and a drive means for driving the slider;

wherein at least one of the detachable cassettes includes an XY table connectable to a respective slider for movement therewith via a means for detachably connecting the XY table to the respective slider, on which XY table is mounted a holder for detachably holding and rotating a tool, and which XY table can move the holder in the direction orthogonally intersecting the slider traveling direction, and wherein others of the processing units include press working units, so that different processing operations, including machining and press working operations, can be performed in succession.

10. An index-feed processing system as set forth in claim 9 wherein the drive means is a mechanism including a servomotor and a screw pair.

11. An index-feed processing system as set forth in claim 10 wherein the screw pair is a recirculating ball lead screw.

12. An index-feed processing system as set forth in claim 9 wherein in each unit body, the slider is adapted so as to slide along a guide bar provided between the base plate and the support plate.

13. An index-feed processing system as set forth in claim 9 wherein a drive means for driving the XY table is a linear motor.

14. An index-feed processing system as set forth in claim 9, wherein in each unit body, the base plate and the support plate are disposed in parallel with the horizontal plane, and the slider is provided vertically movably.

15. An index-feed processing system as set forth in claim 14 wherein the drive means is a mechanism including a servomotor and a screw pair.

16. An index-feed processing system as set forth in claim 15 wherein the screw pair is a recirculating ball lead screw.

* * * * *